July 31, 1962 J. R. BROWN, JR 3,047,730
BIPOLAR CURRENT STEERING SWITCH
Filed Oct. 10, 1960
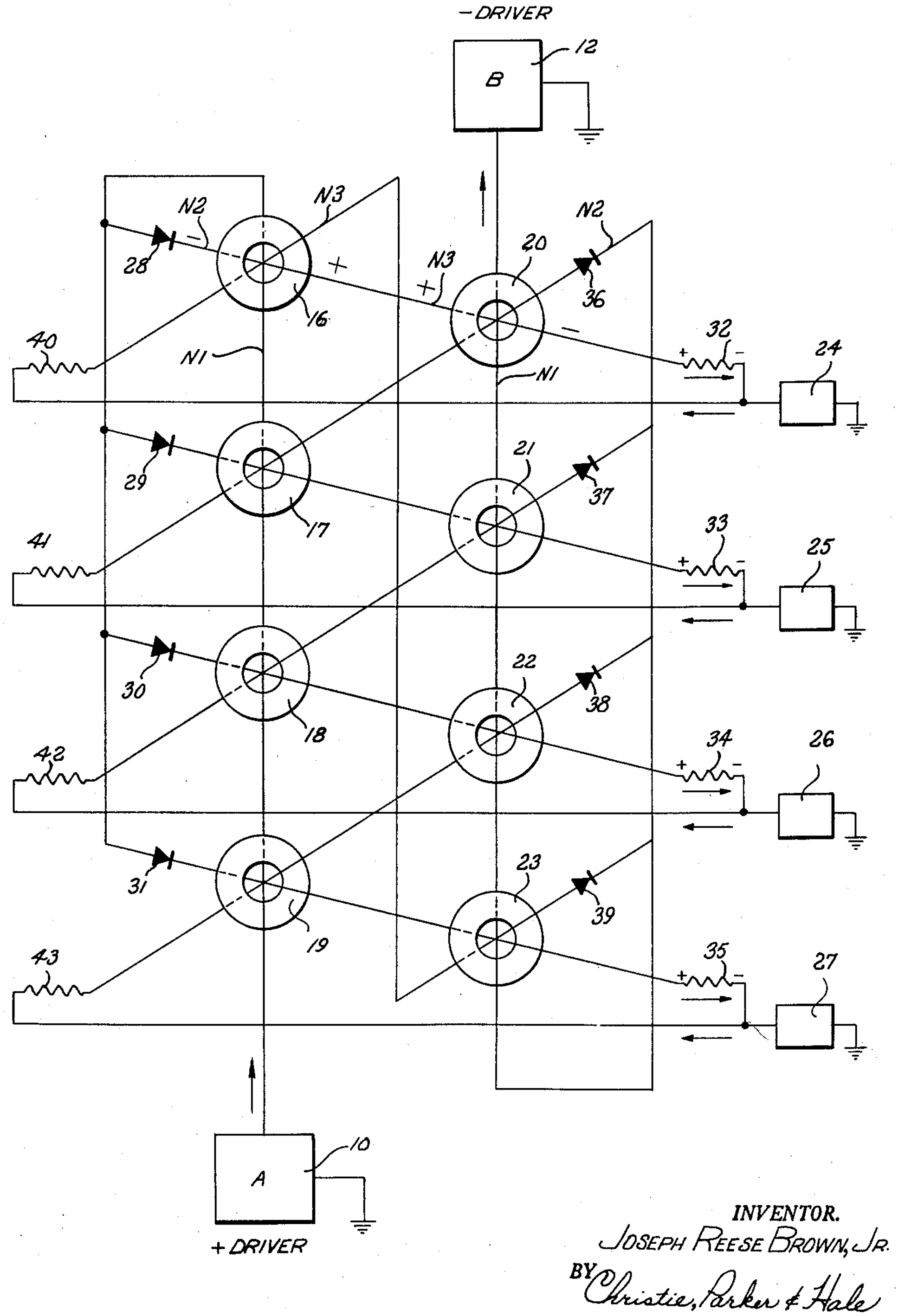
INVENTOR.
JOSEPH REESE BROWN, JR.
BY Christie, Parker & Hale
ATTORNEYS United States Patent Office 3,047,730

Patented July 31, 1962

3,047,730

BIPOLAR CURRENT STEERING SWITCH

Joseph Reese Brown, Jr., Pasadena, Calif., assignor to Burroughs Corporation, Detroit, Mich., a corporation of Michigan Filed Oct. 10, 1960, Ser. No. 61,432

3 Claims. (Cl. 307—88)

This invention relates to magnetic core switching circuits, and more particularly, to a commutating switch for use in addressing sequential access core memory circuits.

Core memory circuits are well known in which magnetic cores having a square loop hysteresis characteristic are arranged to store information in binary-coded form. The cores of the memory circuit may be addressed individually or in groups by driver circuits which pass current through the selected cores in one direction or the other to either write information in or read information out of the selected cores. In some applications, it is not necessary that cores be addressed in random fashion, but, on the contrary, it is desirable that the cores be addressed in a predetermined sequence. All core memory circuits including sequential access memory systems require that both the read and write operations be performed on each addressed core or group of cores. In order to read information out of the cores, the cores must be cleared. This is referred to as destructive readout and must be followed by the write operation to restore the cores to their initial position after the read operation. By the same token, the write operation requires that the cores first be cleared. Thus in either the read or the write operation, current pulses of both polarities are pulsed through the selected core or group of cores.

It has heretofore been proposed to use magnetic cores to steer current pulses through a succession of load circuits such as memory core drive lines. Such known core switching circuits have been limited to pulsing current through the load in one direction. Such known circuits have the disadvantage that two sets of switching circuits, including two wires linking the memory core, must be provided for achieving both the read and write operations. The present invention is an improvement on such known core current steering switches in that bipolar current pulses are sequentially pulsed through a plurality of load circuits to provide both read and write operations.

In brief, the present invention provides a circuit for successively pulsing a plurality of loads with bipolar current pulses derived from two alternately actuated pulse sources of opposite polarities. One source pulses current through the series connected primary windings of a first group of square loop magnetic cores. The other source pulses current through the series conducted primary windings of a second group of square loop magnetic cores. Each load is connected by the series connect primary windings to the respective pulse sources through two separate current paths, each current path including a diode and the series connected secondary windings of two of the cores. The primaries of the two cores are in different ones of said two groups. By this arrangement, only one core is set at a time and current is pulsed through a particular load in a direction determined by which core is set. At the same time, the core is reset by the current pulse and another core is in turn set. As successive cores are individually set and reset by current pulses from the two sources, the load circuits are pulsed in succession by currents of one polarity and then the other.

For a more complete understanding of the invention, reference should be had to the accompanying drawing wherein the single figure is a diagrammatic representation of the circuit of the present invention.

Referring to the figure in detail, the numerals 10 and 12 indicate generally a positive current driver and a negative current driver, both of which have one terminal connected to ground as a common return. The direction of current flow produced by the pulsing of the respective drivers in indicated by the arrows.

The circuit includes two groups of cores, the first group being shown, by way of example, as including four cores, indicated at 16, 17, 18 and 19, and the second group including four cores, indicated at 20, 21, 22 and 23. Each core is made of ferrite or similar magnetic material having a substantially rectangular hysteresis characteristic. Each core is provided with three windings, a primary or driver winding $N_1$ and two secondary or driven windings $N_2$ and $N_3$. While the windings are shown as single conductors passing through the central aperture of the respective cores, the windings, in fact, include a number of turns which is determined by design consideration hereinafter described.

The primary windings $N_1$ of the first group of cores 16–19 are connected in series to the output of the driver 10. The current pulse from driver 10 flows through the four primary windings and is directed to one of four loads 24, 25, 26 or 27 through one of four output circuits. Each output circuit includes the winding $N_2$ on a core in the first group of cores 16–19 and the series connected winding $N_3$ on a core of the second group of cores 20–23. Each output circuit also includes a diode, as indicated respectively at 28, 29, 30 and 31, and a series resistor, as indicated respectively at 32, 33, 34 and 35. The diodes 28–31 are polarized to pass current in one direction to the respective loads from the positive driver 10.

In similar fashion, the primary windings $N_1$ of the second group of cores 20–23 are connected in series to the negative driver 12. A plurality of output circuits provides current paths to the respective loads 24–27, each output circuit including the secondary winding $N_2$ of the respective cores 20–23, and the secondary winding $N_3$ of the respective cores 16–19. In addition, each output circuit includes a diode, as indicated respectively at 36, 37, 38 and 39, and a series resistor, as indicated respectively at 40, 41, 42 and 43. The diodes are arranged to pass current from the negative driver source 12 in the opposite direction to the respective loads from the current provided from the driver 10.

In operation, the drivers 10 and 12 are arranged to be pulsed alternately by any conventional pulsing means (not shown). Initially, the flux is cleared in one direction in all the cores but one, the single core being set with the flux in the opposite direction. Only the flux in the core that is set is switched by a current pulse from the associated driver coupled to its primary winding. For example, consider that the core 16 is set and all the other cores are cleared. A current pulse from the driver 10 switches flux in the core 16. This, in turn, induces a voltage across the secondary winding $N_2$ of the core 16. The polarity of this voltage is such as to forward bias the diode 28 and to back bias the diodes 29, 30 and 31. As a result, current from the driver 10 flows through the forward biased diode 28, the secondary winding $N_2$ of the core 16 and the secondary winding $N_3$ of the core 20 and back to ground through the resistor 32 and load 24. The current pulse, in passing through the two windings $N_1$ and $N_2$ of the core 16, produces opposing flux so that the effective turns for switching flux is equal to the difference between the number of turns in the primary $N_1$ and the number of turns in the secondary $N_2$. Therefore, one design requirement is that the number of turns in the primary $N_1$ be sufficiently greater than the number of turns in the secondary $N_2$ to cause flux to switch in the core.

To insure that the flux in the core 20 is set before all the flux in the core 16 is reset, the number of turns in the secondary winding $N_3$ must be greater than the difference between the number of turns in the winding $N_1$ and the number of turns in the winding $N_2$. In this manner, at the end of the current driver pulse from the driver 10, the flux in the core 16 is reset, and the flux in the core 20 is set. At the same time, the load 24 has been pulsed by current passing in one direction through the load. The load 24 may be a core in a memory circuit, the flux of which is set in one direction in response to pulsing of the driver 10.

Upon pulsing of the driver 10, the driver 12 is pulsed providing a negative current pulse which passes through the series connected primary windings $N_1$ of the second group of cores 20–23. The current pulse from the driver 12 flows through the primary windings of the second group of cores in a direction to reset the flux in the core 20. No flux of course will switch in any of the other cores in the second group. In exactly the manner described above in connection with the current pulse from the driver 10, the current pulse from the driver 12 produces a voltage across the secondary winding $N_2$ of the core 20. The polarity of this voltage is such as to forward bias the diode 36 and to back bias the diodes 37, 38 and 39. As a result, current flows from the driver 12 through the load 25, the resistor 41, the secondary winding $N_3$ of the core 17, the secondary winding $N_2$ of the core 20, the forward biased diode 36, through the four series connected primary windings $N_1$ of the second group of cores and back to the driver 12. The flux in the core 17 is thereby set and the flux in the core 20 is reset. Also the current is pulsed through the load 25 in the opposite direction to the current pulsed through the load by the driver 10.

By the next pulse from the driver 10, current is pulsed by the diode 29 through the load 25 in the opposite direction from the current produced through the load 25 by the driver 12. It will, therefore, be appreciated that by alternate pulsing of the drivers 12 and 10 successively, loads are alternately pulsed by reverse and forward currents.

What is claimed is:

1. A bipolar magnetic switch circuit comprising first and second groups of magnetic cores having a square hysteresis loop characteristic, a drive winding on each core of both groups, a first current pulse source of one polarity connected in series with the drive windings of the first group of cores, a second current pulse source of opposite polaity connected in series with the drive windings of the second group of cores, the pulse sources being connected to a common return, first and second driven windings on each core, a first group of output circuits, each output circuit of the first group including a diode, a first driven winding of a core in the first group of cores and a second driven winding of a core in the second group of cores connected in series, the first group of circuits being connected at one end to the first current pulse source through the series connected first group of drive windings, a second group of output cicuits, each circuit of the second group including a diode, a first driven winding of a core in the second group of cores and a second driven winding of a core in the first group of cores connected in series, the second group of output circuits being connected at one end to the second current pulse source through the series connected second group of drive windings, a plurality of load circuits connected at one end to the common return and at the other end to one of the output circuits in both the first and second group of output circuits, the diodes in the two output circuits associated with each load circuit being arranged to pass current in opposite directions through the associated load circuit.

2. Apparatus for successively pulsing a plurality of load circuits with a bipolar current, said apparatus comprising first and second current pulse sources each having one terminal connected to one terminal of each of the load circuits, a plurality of square loop magnetic cores each having three windings, the number of cores being equal to twice the number of load circuits, unidirectional current conductive means for connecting two windings of a first core and one winding of a second core in series between the first source and a first load circuit, said two windings on the first core being connected to induce opposing flux in the first core, and unidirectional current conductive means for connecting two windings of the second core and one winding of a third core in series between the second source and a second load circuit, said two windings on the second core being connected to produce opposing flux in the second core.

3. Apparatus for successively pulsing a plurality of load circuits with a bipolar current, said apparatus comprising first and second current pulse sources each having one terminal connected to one terminal of each of the load circuits, a plurality of square loop magnetic cores each having three windings, the number of cores being equal to twice the number of load circuits, unidirectional current conductive means for connecting two windings of a first core and one winding of a second core in series between the first source and each of the load circuits, and unidirectional current conductive means for connecting two windings of a first core and one winding of a second core in series between the second source and each of the load circuits.

References Cited in the file of this patent

UNITED STATES PATENTS

| | | |
|---|---|---|
| 2,832,951 | Browne | Apr. 29, 1958 |
| 2,987,707 | Fuller et al. | Jan. 31, 1961 |
| 2,970,295 | Bonn | June 6, 1961 |